US006880162B2

United States Patent
Takagi et al.

(10) Patent No.: US 6,880,162 B2
(45) Date of Patent: Apr. 12, 2005

(54) DISK DRIVE HAVING AN AIR FLOW PATH ROOM

(75) Inventors: Keiichi Takagi, Tokorozawa (JP); Toshiyuki Kaneko, Tokorozawa (JP); Akira Ohsuga, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 192 days.

(21) Appl. No.: 10/251,984

(22) Filed: Sep. 23, 2002

(65) Prior Publication Data

US 2003/0058772 A1 Mar. 27, 2003

(30) Foreign Application Priority Data

Sep. 26, 2001 (JP) ........................................ 2001-294926

(51) Int. Cl.⁷ ............................................. G11B 33/14
(52) U.S. Cl. .................................... 720/649; 360/97.02
(58) Field of Search ....................... 360/97.02; 720/649, 720/600, 648; 369/75.1, 75.11, 77.1, 77.11

(56) References Cited

U.S. PATENT DOCUMENTS

| | | | | |
|---|---|---|---|---|
| 5,255,256 A | * | 10/1993 | Engler et al. | 369/77.2 |
| 5,301,178 A | * | 4/1994 | Okabe et al. | 369/77.1 |
| 5,335,217 A | * | 8/1994 | Kaneda et al. | 369/77.2 |
| 5,426,628 A | * | 6/1995 | Ishii | 369/77.1 |
| 6,320,723 B1 | * | 11/2001 | Bernett | 360/97.02 |

FOREIGN PATENT DOCUMENTS

JP 2000-231782 A * 8/2000

* cited by examiner

Primary Examiner—Julie Anne Watko
(74) Attorney, Agent, or Firm—Armstrong, Kratz, Quintos, Hanson & Brooks, LLP

(57) ABSTRACT

A frame body 11 disposed within a case body 2 is provided with a main-body portion 20 for rotating an optical disk 28 to thereby read recorded information therefrom. The frame body 11 is assembled with a cooling fan 13. The frame body 11 is provided with a duct part communicated with a suction side of the cooling fan 13. The frame body 11 is mounted with a circuit board 81 for closing a lower surface of the frame body 11 and covering the below of the main-body portion 20, to thereby define a machine room and an airflow path room within the case body 2. The circuit board 81 is formed with a through-hole 83. Fresh air is allowed to efficiently contact with electrical components to thereby cool them.

6 Claims, 6 Drawing Sheets

DISK DRIVE HAVING AN AIR FLOW PATH ROOM

BACKGROUND OF THE INVENTION

1. Field of the Invention

The present invention relates to a disk drive including a case body, and a main-body portion and a circuit board both disposed within the case body.

2. Description of Related Art

There have been conventionally and widely utilized disk drives for reproducing a piece of information from or recording/reproducing a piece of information into/from an optical disk such as a DVD (Digital Versatile Disk) or Compact Disc. Such disk drives are known to have a constitution exemplarily shown in FIG. 6.

FIG. 6 shows a disk drive 101 having a case body 102 made of metal in an approximately box-like shape opened at one face. Disposed within the case body 102 is an approximately parallelepiped frame body 103 having rigidity and made of synthetic resin. Disposed in the frame body 103 are: disk rotating driver 104 for rotating an optical disk; reproducer 105 having an optical sensor for recording a piece of information into or reproducing the piece of information recorded in the optical disk; and a main-body portion 106 having moving structure (not shown) for moving the reproducer 105 relative to the optical disk. Further, disposed in the frame body 103 is a disk tray (not shown) for placing the optical disk thereon and capable of moving through the opened one face of the case body 102 in a manner capable of advancing and retracting. Disposed on the frame body 103 is a cooling fan 108.

Disposed within the case body 102 is a circuit board 112 equipped with a controlling circuit having electrical components 111 for controlling the operation of the main-body portion 106. This circuit board 112 is mounted on a bottom lower surface of the frame body 103 which surface is reverse to the bottom upper surface of the frame body 103 provided with the main-body portion 106, in a state that the circuit board 112 covers substantially the whole of the bottom lower surface of the frame body 103. The circuit board 112 is also disposed in a state that the surface of the circuit board 112 provided with the electrical components 111 having particularly higher heat release values is disposed to oppose to the bottom inner or upper surface of the case body 102 at a predetermined clearance. Note, the circuit board 112 is also disposed to oppose to the bottom lower surface of the frame body 103 at another predetermined clearance. Mounted on the bottom inner surface of the case body 102 are heat radiating members 116 such as made of silicone rubber having thermal conductivity and electrical insulation ability so as to be closely contacted with the electrical components 111 having particularly higher heat release values.

The heat-generating electrical components 111 of the circuit board 112 are cooled, since the generated heat is conducted to the case body 102 via heat radiating members 116. Further, driving the cooling fan 108 sucks air from a gap of the case body 102 and then through between the circuit board 112 and frame body 103 toward the cooling fan 108, and the air heat-exchanged with the circuit board 112 is discharged as an exhaust airstream to the exterior of the case body 102 to thereby cool the circuit board 112. Note, the air flowed by driving the cooling fan 108 never flows into the main-body portion 106 isolated therefrom by a covering plate 103a provided on the frame body 103, thereby avoiding that the operation of the main-body portion 106 is obstructed by dust and dirt included in the flowing air.

However, in the disk drive 101 having the structure shown in FIG. 6, the electrical components 111 having particularly higher heat release values are arranged on that lower surface of the circuit board 112 which opposes to the case body 102, because the electrical components 111 are required to forcibly radiate heat to the case body 102. As such, the fresh or outside air flowing along the upper surface of the circuit board 112 opposing to the frame body 103 fails to efficiently contact with the electrical components 111, so that the electrical components 111 are not efficiently cooled. Thus, the electrical components 111 having particularly higher heat release values are not sufficiently cooled, thereby possibly causing a problem that the temperature within the disk drive 101 is raised such that the driving performances of the main-body portion 106 and a disk are exposed to thermal loads, to thereby lower the tolerances of the driving performances against temperature.

SUMMARY OF THE INVENTION

It is therefore an object of the present invention to provide a disk drive capable of improving a cooling performance for heat-generating members to thereby efficiently cool a circuit board.

The present invention provides a disk drive comprising: a case body; a frame body accommodated within the case body; a main-body portion disposed on the frame body, and provided with disk rotating driver for rotating a disk and reproducer for reproducing the information recorded in the disk; a circuit board including a heat-generating member for controlling the main-body portion, the circuit board being disposed in a state that the circuit board defines within the case body a machine room for accommodating the main-body portion therein and an airflow path room for allowing fresh air to flow therethrough such that the heat-generating member faces to the airflow path room; and a cooling fan disposed within the case body and having a suction side communicated with the airflow path room.

According to such a constitution, the circuit board including the heat-generating member for controlling the main-body portion disposed on the frame body is disposed in the state that the circuit board defines within the case body the machine room for accommodating the main-body portion therein and the airflow path room for allowing fresh air to flow therethrough such that the heat-generating member faces to the airflow path room. This allows to efficiently cool the heat-generating member of the circuit board by driving the cooling fan to thereby suck, flow and contact the fresh air through the airflow path room and with the heat-generating member, thereby allowing to improve the cooling efficiency of the circuit board, while preventing dust and dirt from entering the main-body portion side.

In the present invention, it is desirable that the frame body is formed in a tube-like shape opened at both end faces in the axial direction, respectively; and the circuit board is mounted to one end face side of the frame body in a manner to tightly close the opening at the one end face side.

According to such a constitution, the circuit board is mounted to one end face side of the frame body formed in a tube-like shape opened at both end faces in the axial direction, respectively, in a manner to tightly close the opening at the one end face side. This allows: to exclude the necessity of such a constitution in the frame body provided with the main-body portion, that covers the main-body portion so as to avoid an occurrence of trouble due to dust and dirt; to utilize the circuit board as the constitution for covering the main-body portion; and to exclude the necessity of a partition such as by the frame body, because the main-body portion and the airflow path room is partitioned by the circuit board; thereby providing a leeway of a height dimension of space for accommodating therein those members such as a pick-up and spindle motor which constitute the main-body portion, to thereby readily realize an improvement of design leeway and a light-weighted and downsized frame body.

In the present invention, it is desirable that the disk drive further comprises: a heat radiating member having thermal conductivity, the heat radiating member including one face closely contacted with the heat-generating member of the circuit board and the other face closely contacted with an inner surface of the case body.

According to such a constitution, the heat radiating member having thermal conductivity is arranged such that one face of the heat radiating member is closely contacted with the heat-generating member of the circuit board and the other face of the heat radiating member is closely contacted with the inner surface of the case body. In this way, the heat of the heat-generating member is radiated through the case body in addition to the air-cooling by driving the cooling fan, thereby allowing to improve the cooling efficiency of the heat-generating member.

In the present invention, it is desirable that the cooling fan is disposed on the frame body; and the circuit board is opened with a through-hole for communicating the suction side of the cooling fan with the airflow path room, at the position closer to the suction side of the cooling fan than the heat-generating member.

According to such a constitution, the circuit board is opened with the through-hole for communicating the suction side of the cooling fan with the airflow path room, at the position closer to the suction side of the cooling fan than the heat-generating member. This allows the cooling fan to be assembled into the case body together with the frame body, to thereby improve the assembling manufacturability and obtain a state that the fresh air sucked by driving the cooling fan is assuredly contacted with the heat-generating member.

In the present invention, it is desirable that the frame body comprises: a supporting rib for supporting the main-body portion; and a duct part provided continuously to the supporting rib and having a tip end periphery closely contacted with the circuit board so as to surround the suction side of the cooling fan and the through-hole in a manner isolated from the main-body portion.

According to such a constitution, the duct part having the tip end periphery closely contacted with the circuit board so as to surround the suction side of the cooling fan and the through-hole in a manner isolated from the main-body portion, is provided continuously to the supporting rib for supporting the main-body portion. In this way, there is efficiently generated a negative pressure at the suction side relative to the atmospheric pressure by driving the cooling fan, such that the fresh air is satisfactorily sucked by the cooling fan through the airflow path room and then the through-hole, thereby efficiently cooling the heat-generating member.

In the present invention, it is desirable that the disk drive further comprises: a flexible member having electrical insulation ability and interposed between the circuit board and an inner surface of the case body in a state for partitioning the airflow path room, to thereby surround the through-hole and the heat-generating member.

According to such a constitution, the flexible member having electrical insulation ability and placed between the circuit board and the inner surface of the case body is arranged in a state for partitioning the airflow path room, to thereby surround the through-hole and the heat-generating member. This improves the contacting efficiency between the fresh air sucked by driving the cooling fan and the heat-generating member, thereby improving the cooling efficiency of the heat-generating member.

DETAILED DESCRIPTION OF THE PREFERRED EMBODIMENT(S)

There will be described hereinafter the embodiments according the present invention, with reference to the accompanying drawings.

[Structure of Disk Drive]

Figure 1:
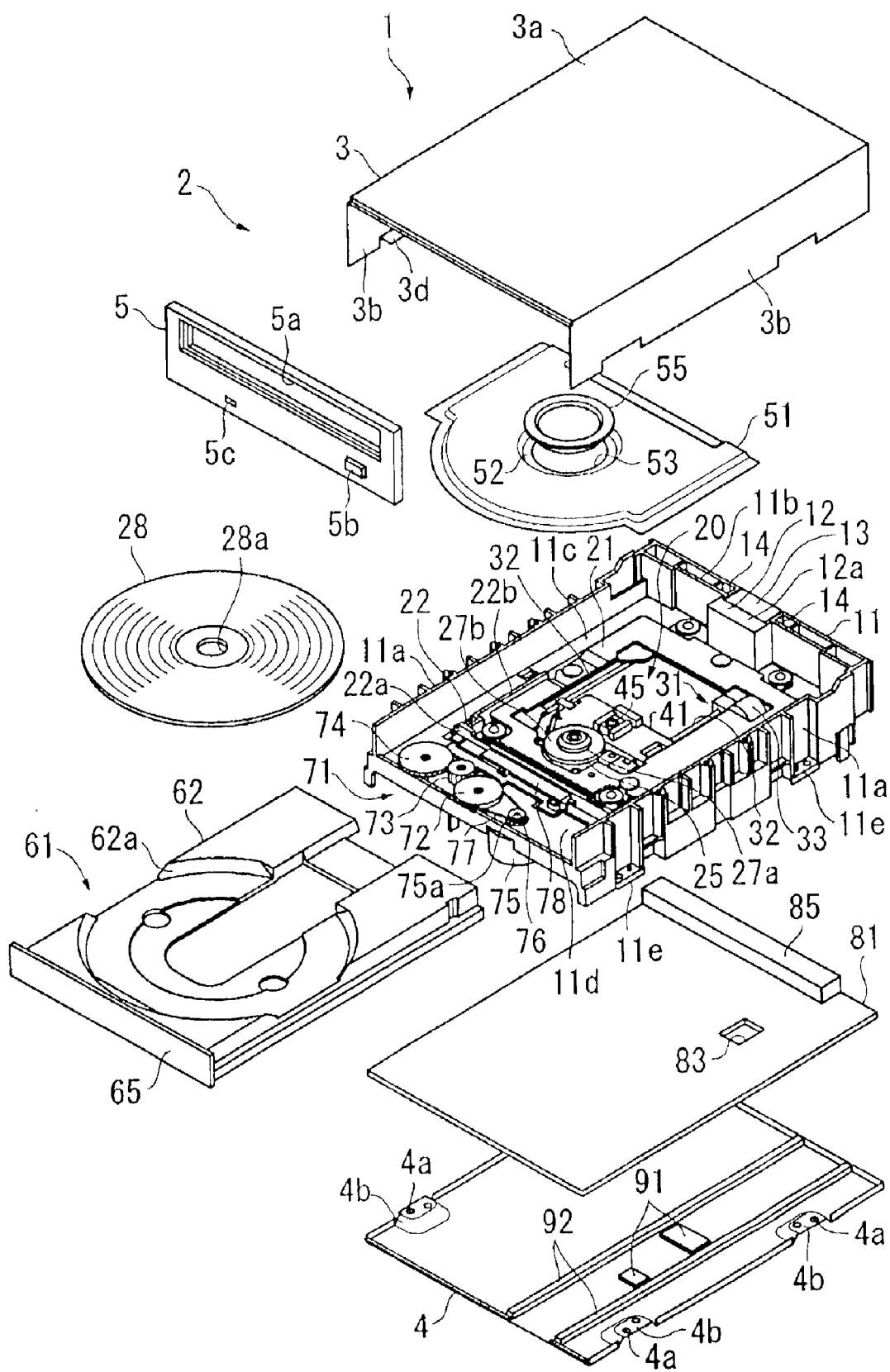
FIG. 1 is an exploded perspective view showing a constitution of a disk drive according to an embodiment of the present invention.

FIG. 1 is an exploded perspective view showing a constitution of a disk drive according to an embodiment of the present invention. This disk drive 1 includes a case body 2 made of metal. This case body 2 includes: an upper case 3 opened at two faces, i.e., lower face and front face; a lower case 4 for closing the lower face of the upper case 3; and a decorative panel 5 for closing the front face of the upper case 3.

Figure 4:
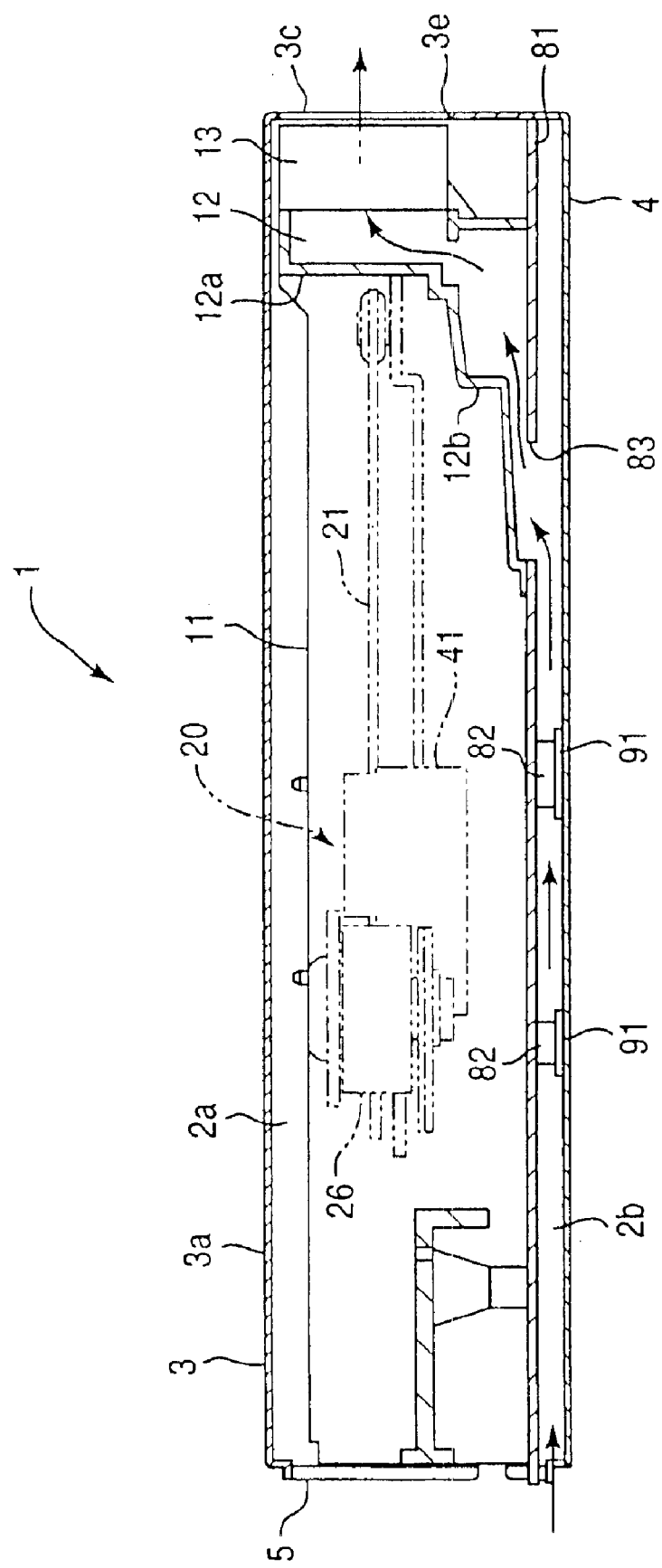
FIG. 4 is a partly omitted side cross-sectional view of the disk drive in the embodiment.

As shown in FIG. 1 and FIG. 4, the upper case 3 is formed to open its lower face and front face, and is constituted of: a top plate portion 3a in a rectangular flat plate shape; lateral plate portions 3b folded and formed substantially vertically at both of longitudinally extending side edges of the top plate portion 3a, respectively; and an end plate portion 3c folded and formed substantially vertically in the same direction as the lateral plate portion 3b, at laterally extending one edge of the top plate portion 3a. Each lateral plate portion 3b of the upper case 3 has a lower end edge provided with, at a plurality of locations such as two locations, mounting piece portions 3d folded and formed inwardly and drilled with screw holes (not shown). Disposed at an approximate center of the end plate portion 3c are a plurality of approximately slit-like exhaust ports 3e.

The lower case 4 is formed in the same rectangular flat plate shape as the top plate portion 3a of the upper case 3. This lower case 4 is provided with mounting dowels 4b, which are drilled with screw holes 4a, respectively, and which are bent to upwardly bulge correspondingly to the mounting piece portions 3d of the top plate portion 3a, respectively.

The decorative panel 5 is formed in an approximately plate-like shape made of a synthetic resin such as Acrylonitrile-Butadiene-Styrene. This decorative panel 5 is protruded with engaging pawl portions (not shown) substantially perpendicularly to one face of the decorative panel 5 so as to disengageably engage with the lateral plate portions 3b of the upper case 3 and with the lower case 4 at tip end portions of the engaging pawl portions, respectively. The decorative panel 5 is opened with an elongated window 5a in the lateral direction, i.e., the longitudinal direction of the decorative panel 5. The decorative panel 5 is further provided with a switch operating portion 5b and an operation confirming viewport 5c.

Disposed within the case body 2 is a frame body 11 made of synthetic resin such as ABS having rigidity and electrical insulation ability. As shown in FIGS. 1 through 4, this frame body 11 includes: lateral face portions 11a closely contacted with inner surfaces of the lateral plate portions 3b of the upper case 3, respectively; an end face portion 11b closely contacted with the inner surface of the end plate portion 3c of the upper case 3; a supporting rib 11c inwardly protruded toward the inner surface side of the lateral face portions 11a and end face portion 11b; and an opening/closing drive disposing portion 11d provided to bridge between those end portions of the lateral face portions 11a which are opposite to the end face portion 11b; and the frame body 11 is formed in an approximately parallelepiped frame shape opening at both end faces in the axial or vertical direction. The lateral face portions 11a of the frame body 11 are provided with mounting rib portions 11e to be clamped and screwed between the mounting piece portions 3d of the upper case 3 and the mounting dowels 4b of the lower case 4, respectively.

As shown in FIGS. 1 through 4, the frame body 11 is provided with a duct part 12. This duct part 12 includes: a duct recess portion 12a in a concave shape directed toward an approximate center at an outer face side of the end face portion 11b; and a duct hood portion 12b protruded integrally and continuously with the lower surface side of the supporting rib 11c protruded from the end face portion 11b, so as to be communicated with the duct recess portion 12a.

The frame body 11 is provided with a cooling fan 13 positioned at the duct recess portion 12a of the end face portion 11b. This cooling fan 13 is supported by ribs 14 protruded from an opening edge of the duct recess portion 12a, and is disposed in a state that the cooling fan 13 has its suction side substantially airtightly communicated with the duct recess portion 12a.

Figure 2:
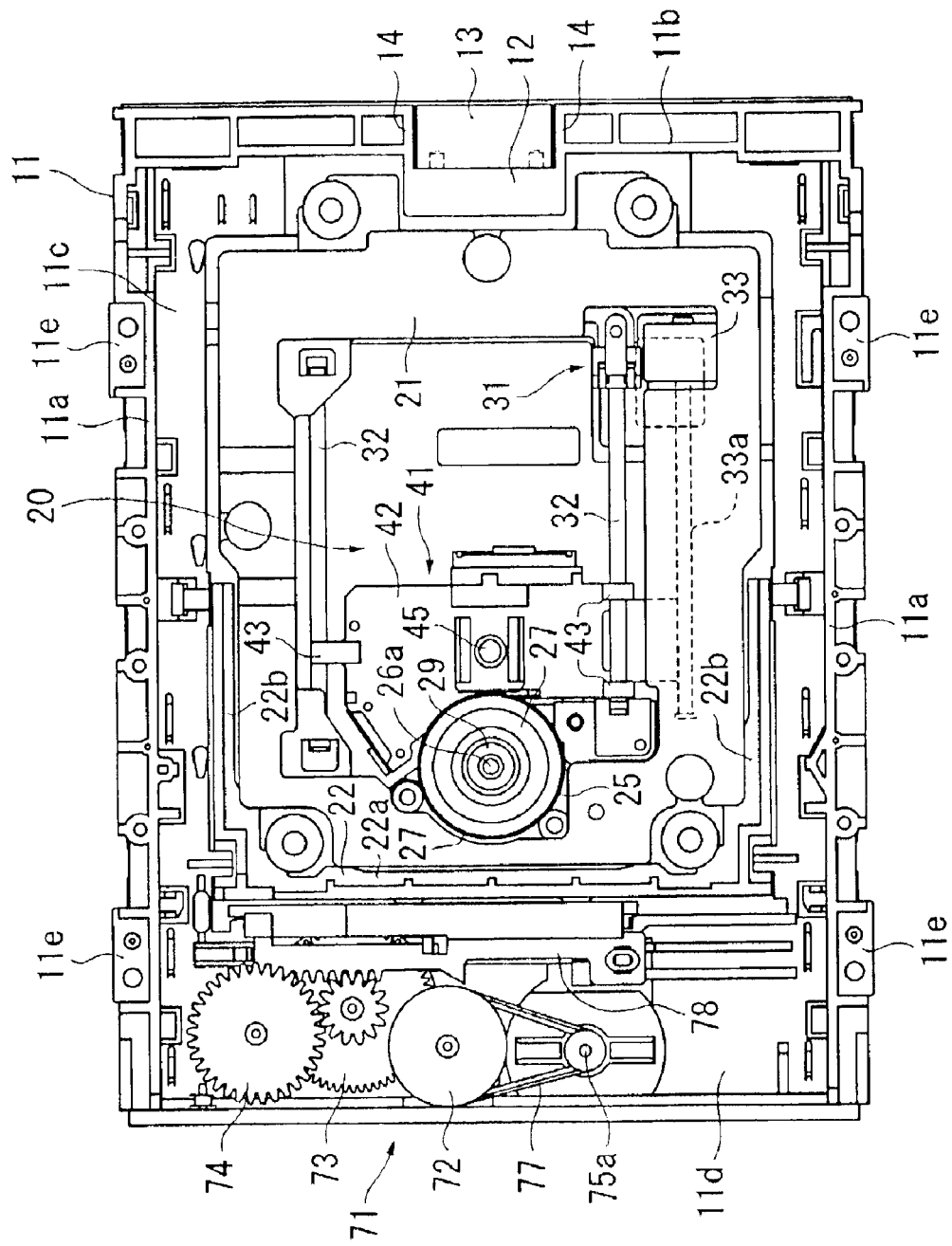
FIG. 2 is a partly omitted plan view of the disk drive in the embodiment.

The frame body 11 is provided with a main-body portion 20. This main-body portion 20 has a pedestal portion 21 such as formed into a flat plate frame shape made of metal. As shown in FIGS. 1 and 2, the pedestal portion 21 has one edge swingable in the vertical direction and the other edge screw-mounted to the supporting rib 11c protruded from the end face portion 11b of the frame body 11. The one edge of the pedestal portion 21 is integrally mounted with a swing guiding portion 22. This swing guiding portion 22 includes: a mount holding portion 22a elongated along that one edge of the pedestal portion 21 to which the swing guiding portion is integrally screwed; and a pair of swing arms 22b which are integrally and perpendicularly protruded from both lateral end portions of the mount holding portion 22a, respectively, and which have tip ends swingably pivoted to the supporting rib 11c protruded from the lateral face portions 11a of the frame body 11 respectively. The swing of the pedestal portion 21 is guided by the swing guiding portion 22.

The pedestal portion 21 is provided with disk rotating driver 25 positioned at the one edge side of the pedestal portion 21 to be swung. As shown in FIGS. 1, 2 and 4, the disk rotating driver 25 includes a rotative electric motor 26 such as a spindle motor and a turntable 27 integrally attached to an output shaft 26a of the rotative electric motor 26. The turntable 27 includes: a rotation shaft 27a in an approximately cylindrical shape to be fitted into a shaft hole 28a opened at the center of an optical disk 28; and a collar portion 27b protruded at the outer periphery of the rotation shaft 27a in a flange-like manner so as to place the periphery of the shaft hole 28a of the optical disk 28 thereon. The tip end portion of the rotation shaft 27a of the turntable 27 is buried with a magnet 29.

Disposed on the pedestal portion 21 is moving structure 31. This moving structure 31 is provided with a pair of guiding shafts 32 and a movement electric motor 33. The pair of guiding shafts 32 are disposed to have their axial directions in the direction from the pivoted other edge of the pedestal portion 21 toward its one edge at the swung side. Further, the movement electric motor 33 includes an output shaft 33a disposed in a state that the axial direction of the output shaft 33a extends along the axial directions of the guiding shafts 32. The output shaft 33a of the movement electric motor 33 has its outer periphery provided with an engaging groove (not shown) in a spiral form.

Disposed on the moving structure 31 is reproducer 41. This reproducer 41 includes a movement holding portion 42 held in a state bridging between the pair of guiding shafts 32. This movement holding portion 42 is provided with: holding portions 43 for moveably fitting therethrough the guiding shafts 32, respectively; and a movement restricting pawl portion (not shown) for engaging with the engaging groove of the output shaft 33a of the movement electric motor 33. Disposed on the movement holding portion 42 of the reproducer 41 are: a light source (not shown); a lens 45 for focusing the light from the light source; and an optical sensor (not shown) for detecting the light reflected from the optical disk 28.

As shown in FIG. 1, the frame body 11 is provided with a rotator supporting member 51 such as formed in a metal plate shape to be screwed and fixed in a state bridging between the lateral face portions 11a. This rotator supporting member 51 is provided, at an approximate center thereof, with a supporting recess 52 concaved upwardly at a position opposing to the turntable 27 of the disk rotating driver 25. Opened at an approximate center of this supporting recess 52 is a supporting hole 53. The supporting recess 52 of the rotator supporting member 51 rotatably places a rotator 55 thereon. This rotator 55 is in an approximately disk-like shape formed to be engageable with a periphery of the supporting hole 53. This rotator 55 is integrally mounted with a magnetic material (not shown) such as a metal plate, so that the rotator 55 cooperates with the turntable 27 to thereby clamp the optical disk 28 between the rotator 55 and turntable 27 by virtue of the magnetic force of the magnet 29 of the turntable 27.

Meanwhile, disposed in the frame body 11 is a disk tray 61 to be moved in a manner capable of advancing and retracting in a horizontal direction above the supporting rib 11c and inside the frame body 11. This disk tray 61 is formed in a plate-like shape such as made of synthetic resin, and includes a tray portion 62 in an approximately rectangular plate shape formed with an opening at a portion corresponding to the disk rotating driver 25 and reproducer 41 of the main-body portion 20. Formed at one end side of the tray portion 62 in the longitudinal direction is a circularly concaved placing recess 62a spread upwardly to thereby place the optical disk 28 thereon. Detachably mounted at one edge of the tray portion 62 in the longitudinal direction is a window closing plate portion 65 formed of the same material as the decorative panel 5 so as to close the window 5a of the decorative panel 5 of the case body 2.

Disposed on the frame body 11 is opening/closing driver 71 positioned at the opening/closing drive disposing portion 11d. This opening/closing driver 71 includes a drive transmission pulley 72, a drive transmission gear 73 engaging with the drive transmission pulley 72, and a movement gear 74 engaged with the drive transmission gear 73 and disk tray 61, in a manner that these members 72, 73, 74 are operatively engaged with one another and rotatably supported by the opening/closing drive disposing portion 11d. The opening/closing driver 71 is provided with an ejecting/receiving electric motor 75. The ejecting/receiving electric motor 75 has its output shaft 75a integrally provided with a pulley 76. Wound around the pulley 76 and drive transmission pulley 72 is an endless belt 77. Driving the ejecting/receiving electric motor 75 rotates the pulley 76, drive transmission pulley 72, drive transmission gear 73 and movement gear 74, to thereby move the disk tray 61.

The opening/closing driver 71 includes a movement cam 78 disposed on the opening/closing drive disposing portion 11d of the frame body 11 in a manner moveable along the opposing direction of the lateral face portions 11a. The movement cam 78 engages with the swing guiding portion 22 integrally mounted on the pedestal portion 21, so that driving the ejecting/receiving electric motor 75 to thereby rotate the drive transmission gear 73 moves the movement cam 78 to thereby swing the pedestal portion 21 in the vertical direction. The movement cam 78 causes the pedestal portion 21 to swing upwardly in a state where the disk tray 61 is retracted and positioned within the frame body 11, and causes the pedestal portion 21 to swing downwardly upon the advancing and retracting movement of the disk tray 61 so that the pedestal portion 21 never interferes with the disk tray 61.

The main-body portion 20 is constituted of the aforementioned disk rotating driver 25, moving structure 31, reproducer 41 and opening/closing driver 71.

As shown in FIGS. 1 and 4, the frame body 11 is mounted with a circuit board 81. This circuit board 81 is mounted on the frame body 11 by means of board mounting pawl portions (not shown) provided on the frame body 11. The circuit board 81 is in a flat plate shape of substantially the same dimensions as the lower case 4 of the case body 2, and is mounted to the frame body 11 in a manner to cover the lower surface of the frame body 11 to thereby cover the main-body portion 20. The circuit board 81 is equipped with a controlling circuit, which controls the operation of the main-body portion 20 and which has electrical components 82 to be regarded as heat-generating members. Note, the circuit board 81 is mounted on the frame body 11 in such a state that the electrical components 82 having particularly higher heat release values oppose to that inner surface of the lower case 4 of the case body 2 which is opposite to the main-body portion 20. Namely, the circuit board 81 in the state mounted to the frame body 11 defines, within the case body 2: a machine room 2a above the circuit board 81, for accommodating therein the frame body 11 provided with the main-body portion 20; and an airflow path room 2b under the circuit board 81 and at a clearance between the circuit board 81 and the inner surface of the lower case 4, for facing to or incorporating therein the electrical components 82.

Figure 3:
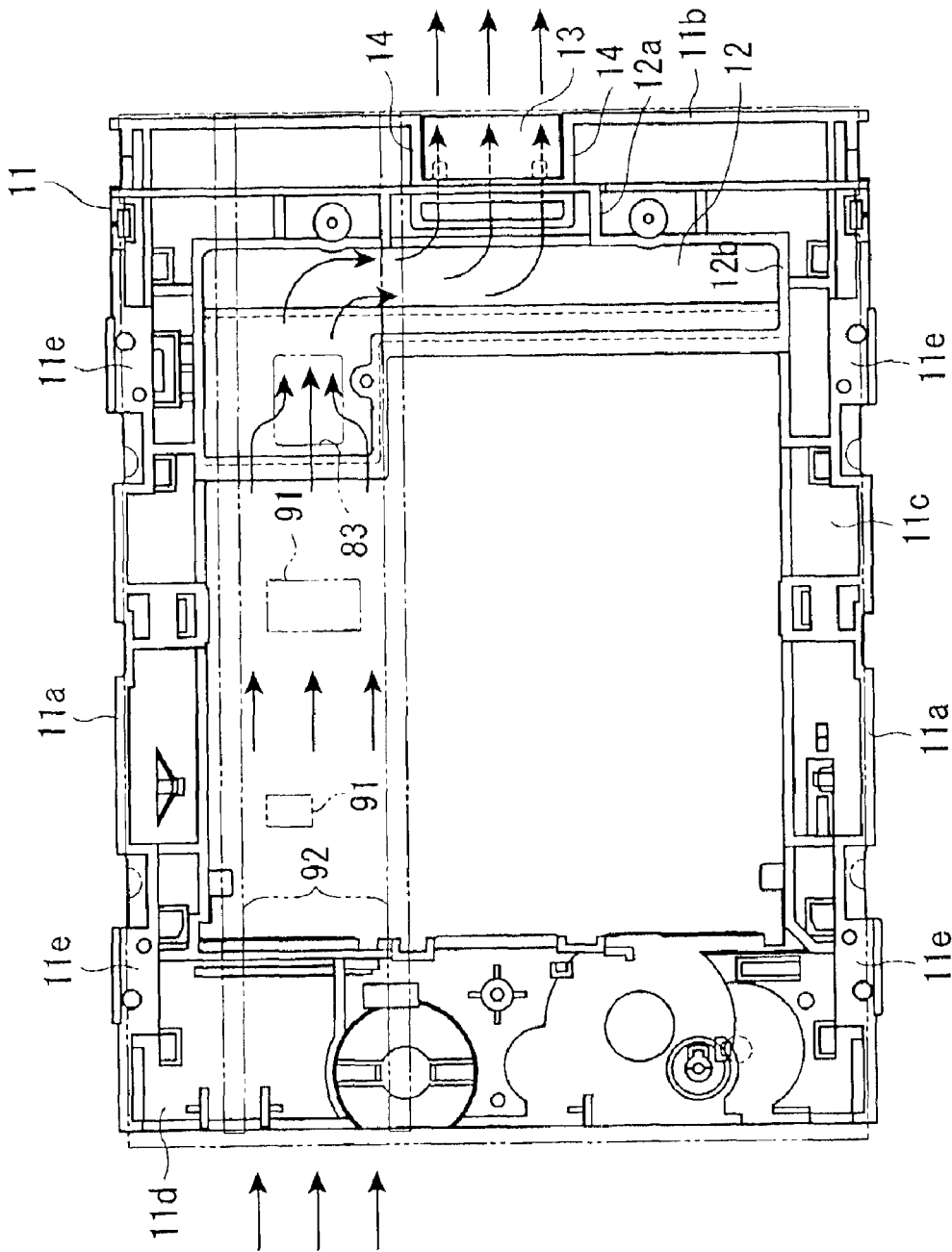
FIG. 3 is a schematic view explaining a cooling state by a fresh air flow in the embodiment.

Further, the circuit board 81 mounted on the frame body 11 is brought into a state that the periphery which is a tip end periphery of the duct hood portion 12b of the duct part 12 of the frame body 11 is closely contacted with the circuit board 81 in an approximately airtight manner, as shown in FIG. 4. The circuit board 81 is formed with a through-hole 83. As shown in FIGS. 3 and 4, this through-hole 83 is arranged at a position surrounded by the duct hood portion 12b of the duct part 12, such that the through-hole 83 is set at a downstream side in the flowing direction of the fresh air, i.e., at a position closer to the suction side of the cooling fan 13 than the electrical components 82 having relatively higher heat release values, in the state where the circuit board 81 is mounted on the frame body 11. The suction side of the cooling fan 13 communicates with the airflow path room 2b, via duct part 12 and this through-hole 83.

The circuit board 81 is provided with a connector portion 85 such as detachably connected with power lines (not shown) and cables for transmitting/receiving signals to/from various exterior electric machines (not shown). This connector portion 85 is disposed in a state that it is positioned at the outer face side of the end face portion 11b of the frame body 11 so as to face to the exterior from the case body 2. Further, the circuit board 81 is integrally mounted with the ejecting/receiving electric motor 75 of the opening/closing driver 71, at the upper surface of the circuit board 81 opposite to the electrical components 82 having particularly higher heat release values. Note, the ejecting/receiving electric motor 75 of the opening/closing driver 71 is shown in a state separated from the circuit board 81 in FIG. 1, for explanative convenience.

Meantime, mounted on the inner surface of the lower case 4 of the case body 2 are heat radiating members 91 such as silicone rubber having thermal conductivity, electrical insulation ability and elasticity, at positions corresponding to the electrical components 82 of the circuit board 81, respectively. Further mounted on the inner surface of the lower case 4 are flexible members 92 such as foamed urethane rubber having electrical insulation ability and elasticity. These flexible members 92 are interposed between the circuit board 81 and the lower case 4 in a state to partition the airflow path room 2b so as to enclose the through-hole 83 of the circuit board 81 and the electrical components 82 having particularly higher heat release values.

[Operation of Disk Drive]

There will be explained hereinafter an operation of the disk drive 1 of the aforementioned embodiment.

Firstly, the disk drive 1 is supplied with an electric power. Supplying the electric power drives the cooling fan 13.

In exemplarily reading the information recorded in the optical disk 28, the switch operating portion 5b of the decorative panel 5 is firstly operated. Operating the switch operating portion 5b turns on/off switches (not shown) provided on the circuit board 81 so that the controlling circuit of the circuit board 81 drives the ejecting/receiving electric motor 75 of the opening/closing driver 71. Driving the ejecting/receiving electric motor 75 rotates the pulley 76, drive transmission pulley 72, drive transmission gear 73 and movement gear 74, so that the disk tray 61 engaged with the movement gear 74 is moved in the advancing direction from the window 5a of the decorative panel 5. During this movement, the movement cam 78 of the opening/closing driver 71 is also moved to thereby downwardly swing the swing guiding portion 22 engaged with this movement cam 78, so that the pedestal portion 21 is downwardly swung to thereby cause the main-body portion 20 to escape from interfering with the disk tray 61.

The optical disk 28 is placed onto the placing recess 62a of the thus advanced disk tray 61, in a state that the recording surface of the optical disk 28 is faced downwardly. Thereafter, the switch operating portion 5b of the decorative panel 5 is again operated to rotatingly drive the ejecting/receiving electric motor 75 of the opening/closing driver 71 to thereby retract the disk tray 61 into the window 5a. During the retraction of the disk tray 61, the main-body portion 20 in the downwardly escaped state is upwardly swung together with the pedestal portion 21 by virtue of the swing guiding portion 22 engaging with the movement cam 78. The upward swing of the main-body portion 20 causes the rotation shaft 27a of the turntable 27 of the disk rotating driver 25 to be fitted into the shaft hole 28a of the optical disk 28. Further, the magnetic force of the magnet 29 of the turntable 27 causes the optical disk 28 to be clamped and fixed between the turntable 27 and rotator 55.

In this state, the controlling circuit of the circuit board 81 controls the main-body portion 20, so that the information recorded in the optical disk 28 to be rotated by the rotative electric motor 26 of the disk rotating driver 25 is read by the optical sensor of the reproducer 41 to be appropriately moved by the moving structure 31.

During the operation of the disk drive 1, the electrical components 82 constituting the controlling circuit of the circuit board 81 are caused to generate heat. The thus generated heat of the electrical components 82 is conducted to the lower case 4 of the case body 2 via heat radiating members 91, and then radiated from the lower case 4 exposed to the atmosphere.

Additionally, driving the cooling fan 13 causes the duct part 12 acting as the suction side of the cooling fan 13 to be brought into a negative pressure state relative to the atmospheric pressure. The negative pressure state of the duct part 12 causes the area of the airflow path room 2b particularly surrounded by the flexible members 92 and communicated with the duct part 12 via through-hole 83, to be also brought into a negative pressure state. The negative pressure state of the airflow path room 2b sucks the fresh air from the gaps of the case body 2, particularly those gaps between the lower case 4 and decorative panel 5. In this way, the sucked fresh air is flowed through the area of the airflow path room 2b particularly surrounded by the flexible members 92 to thereby contact with the heat-generating electrical components 82 faced to the airflow path room 2b, as shown in FIGS. 3 and 4. The fresh air contacted with the electrical components 82 cools them by heat exchange. In turn, the heated fresh air by the heat exchange is flowed into the duct part 12 via through-hole 83, and then discharged as an exhaust airstream to the atmosphere from the exhaust port 3e by the cooling fan 13.

[Effect of Disk Drive]

As described above, the above embodiment exhibits the following functions and effects.

Namely, the circuit board 81 having the electrical components 82 constituting the controlling circuit for controlling the operation of the main-body portion 20 disposed on the frame body 11 is provided in a state that the circuit board 81 partitions the case body 2 into the machine room 2a accommodating therein the main-body portion 20 and the airflow path room 2b communicated with the suction side of the cooling fan 13 thereby allowing to flow the fresh air through the airflow path room 2b, such that the electrical components 82 face to the airflow path room 2b. This allows to efficiently cool the electrical components 82 of the circuit board 81 by driving the cooling fan 13 to thereby suck, flow and contact the fresh air through the airflow path room 2b and with the electrical components 82, thereby allowing to improve the cooling efficiency of the circuit board 81, while preventing dust and dirt from entering the main-body portion 20 side.

Further, the circuit board 81 is mounted in a state to tightly close the opening at the one end face side of the tube-like frame body 11 opened at its both end faces in the axial direction. This allows to utilize, for the frame body 11 provided with the main-body portion 20, the circuit board 81 as a component for covering the main-body portion 20 so as to avoid an occurrence of trouble due to dust and dirt, thereby enabling to exclude the necessity to separately provide such a covering component, to thereby simplify the structure and reduce the vertical dimension of the frame body, thereby allowing to readily realize the improvement of manufacturability and the light-weighted and downsized frame body.

Further, the heat radiating members 91 having thermal conductivity are interposed between the electrical components 82 and the lower case 4, so as to be closely contacted with the electrical components 82 of the circuit board 81 having particularly higher heat release values and with the inner surface of the lower case 4 of the case body 2. This radiates the heat of the electrical components 82 via case body 2 together with the air-cooling by driving the cooling fan 13, to thereby improve the cooling efficiency by virtue of the simple constitution of the heat radiating members 91, thereby allowing to sufficiently cool the electrical components 82 having particularly higher heat release values.

Further, the circuit board 81 is opened with the through-hole 83 for communicating the suction side of the cooling fan 13 with the airflow path room 2b, at the position closer to the suction side of the cooling fan 13 disposed on the frame body 11 than the electrical components 82 having particularly higher heat release values. This allows the cooling fan 13 to be assembled to the frame body 11 and then assembled into the case body 2 together with the frame body 11 upon assembling the disk drive 1, to thereby improve the assembling manufacturability and obtain a state that the fresh air sucked by driving the cooling fan 13 is assuredly contacted with the electrical components 82 so that the electrical components 82 can be assuredly and efficiently cooled.

Further, continuously to the supporting rib 11c supporting the main-body portion 20 of the frame body 11, there is provided the duct part 12 having its tip end periphery closely contacted with the circuit board 81 so as to surround the suction side of the cooling fan 13 and the through-hole 83 of the circuit board 81 in a manner isolated from the main-body portion 20. This allows to efficiently generate a negative pressure relative to the atmospheric pressure at the suction side of the cooling fan 13 by driving the same, to thereby efficiently suck the fresh air toward the cooling fan 13 through the airflow path room 2b and the through-hole 83, thereby allowing to efficiently cool the electrical components 82. Further, the duct part 12 is provided continuously to the supporting rib 11c while utilizing the supporting rib 11c, thereby enabling to exclude the necessity to separately provide the constitution of the duct part 12, to thereby simplify the structure of the frame body, thereby allowing to readily realize the improvement of manufacturability and the light-weighted and downsized frame body 11. Moreover, the duct part 12 is closely contacted with the circuit board 81, thereby allowing to avoid wobbling.

Further, the flexible members 92 having electrical insulation ability in the state for surrounding the through-hole 83 and electrical components 82 are arranged to partition the airflow path room 2b between the circuit board 81 and the inner surface of the case body 2. This allows to improve the contacting efficiency of the fresh air sucked by driving the cooling fan 13 with the electrical components 82, thereby allowing to improve the cooling efficiency of the electrical components 82.

Further, providing the heat radiating members 91 and flexible members 92 allows to ensure the height dimension of the airflow path room 2b, thereby allowing to avoid such a trouble that the lower case 4 is deformed and the airflow path room 2b is collapsed to thereby deteriorate the fresh air flow, and thereby allowing to avoid wobbling.

[Modified Embodiment]

The present invention is not limited to the aforementioned embodiment, and embraces the following modified embodiment within a scope capable of achieving the object of the present invention.

Namely, the disk drive 1 of the present invention is not limited to the constitution applicable to the optical disk 28, and applicable to any disk such as a magnetic disk and magneto-optical disk capable of optically or magnetically reproducing and recording a piece of information.

Further, there has been explained the constitution provided with the disk tray 61 to be moved by the opening/closing driver 71. However, it is possible to adopt any suitable constitutions without providing the disk tray 61, in such a manner: to directly insert the optical disk 28 into the window 5a of the decorative panel 5, while providing a loading device for inserting and ejecting the optical disk 28 such as by an internally disposed rotating body; to directly insert an entity comprising a case and a disk rotatably accommodated therein such as an MD (Mini Disk) into the window 5a or discharge the entity therefrom; to accommodate a disk such as into a predetermined case, and to insert or eject this case; or to exclude even the opening/closing driver 71, while the case body 2 openably and closably closes above the main-body portion 20 by the upper case 3 such that the disk is mounted onto a predetermined position and then the upper case 3 is swung to cover the disk.

There has been explained the constitution for accommodating the frame body 11 within the case body 2 in the approximately box-like shape so as to enclose the frame body 11. However, it is possible to adopt such a constitution that: the frame body 11 is partly exposed from the case body 2; or the frame body 11 is accommodated within the case body 2 by at least a portion of the frame body 11 such that this portion partly constitutes the case body 2 and the main-body portion 20 is not exposed.

Figure 5:
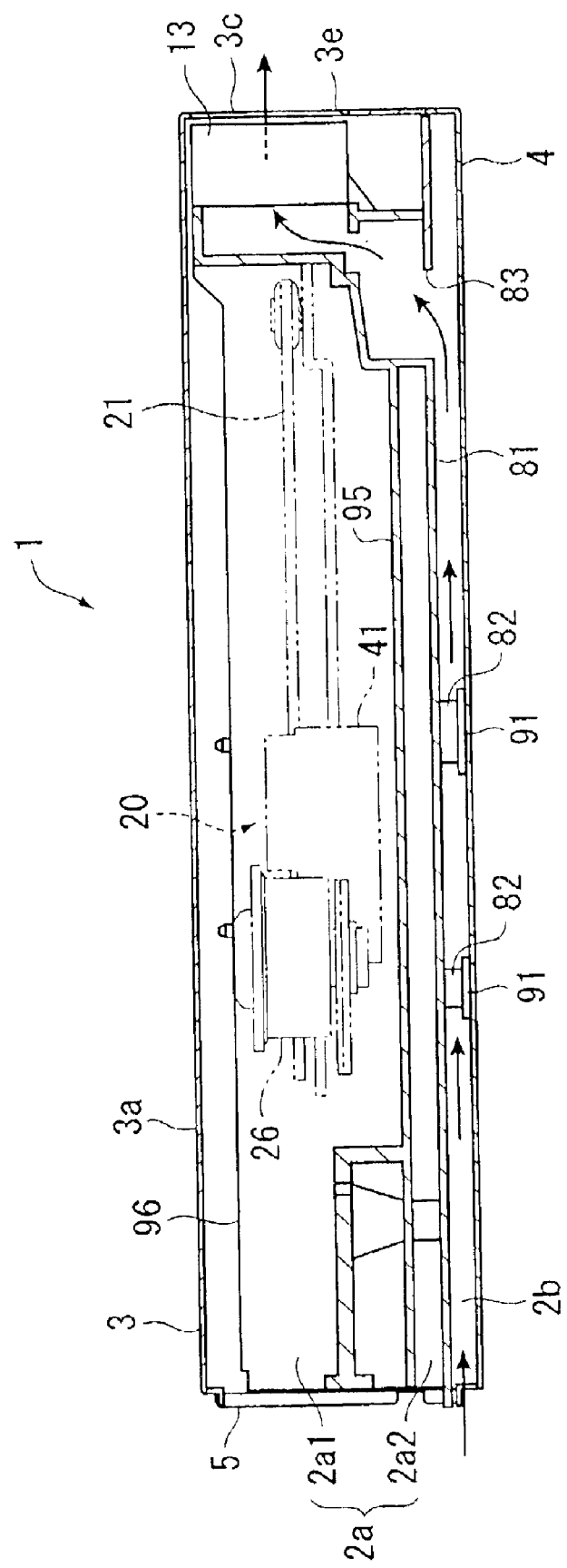
FIG. 5 is a partly omitted side cross-sectional view of a disk drive according to another embodiment of the present invention.
Figure 6:
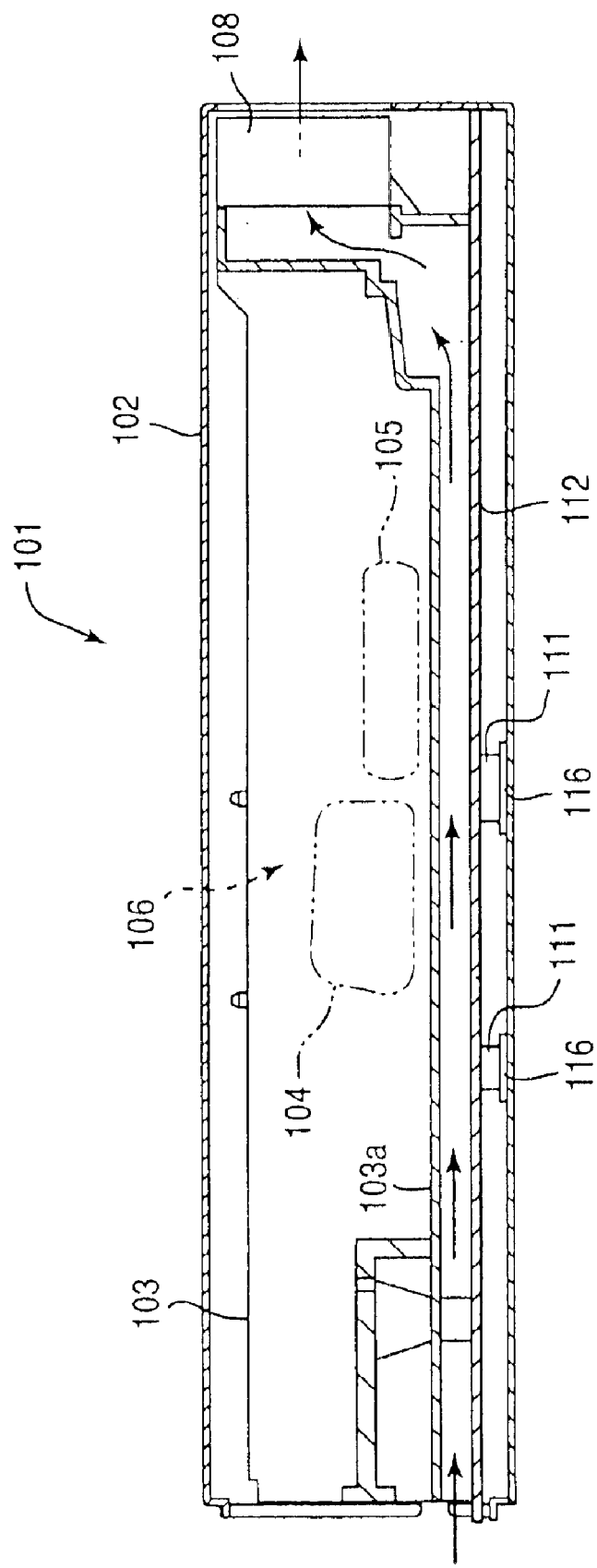
FIG. 6 is a partly omitted side cross-sectional view of a conventional disk drive.

There has been explained the constitution where the circuit board 81 separates the machine room 2a from airflow path room 2b. However, it is possible to adopt a constitution shown in FIG. 5 such that there is provided a partitioning wall 95 such as a partition for separating the main-body portion 20 from the circuit board 81 side in the frame body 11 of the embodiment shown FIGS. 1 through 4, while mounting the circuit board 81 to the lower surface side of a frame body 96 shown in FIG. 5, i.e., to the face of the partitioning wall 95 opposite to the side provided with the main-body portion 20. Mounting the circuit board 81 causes: the machine room 2a to be constituted of a main-body portion room 2a1 provided with the main-body portion 20 and a space 2a2 defined by the partitioning wall 95 and circuit board 81; and the airflow path room 2b for flowing the fresh air by the suction of the cooling fan 13, to be defined by the circuit board 81 and case body 2.

Meanwhile, there has been described the constitution for providing the flexible members 92 to thereby cool the electrical components 82 having particularly higher heat release values. However, it is constitutionally possible to exclude the flexible members 92 such that the fresh air is flowed through substantially the whole of the airflow path room 2b. Further, these flexible members 92 are not limited to the constitution to be mounted to the lower case 4, and it is constitutionally possible to directly mount the flexible members to the circuit board.

The heat radiating members 91 have been explained to be mounted to the lower case 4. However, it is possible to directly mount the heat radiating members 91 to the electrical components 82, or even to omit the heat radiating members 91 in case of lower heat release values of the electrical components 82.

The duct part 12 has been provided continuously to the supporting rib 11c. However, it is possible to mount a separate member like the duct hood portion 12b exemplarily to the supporting rib 11c. Note, adopting a deformable member like the flexible member 92 as such a separate member enables to readily provide a structure of the duct hood portion 12b, to improve the adherence to the circuit board 81, and to assuredly prevent dust and dirt included in the fresh air from entering the machine room 2a side accommodating the main-body portion 20 therein, thereby enabling to obtain a stable operation over a long period of time. Note, it is possible to exemplarily provide a flexible member at that portion of the duct hood portion 12b closely contacted with the circuit board 81 in the aforementioned embodiment, to thereby obtain the same effect of the improved adherence.

The cooling fan 13 has been explained to be assembled to the frame body 11, 96. However, the cooling fan may be arranged at any suitable position. Note, the frame body 11, 96 is provided with the plurality of ribs 14 for reduced weight and improved reinforcement, thereby rather obtaining the structure of the ribs 14 for assembling the cooling fan 13 thereto. This allows to readily obtain the constitution for assembling the cooling fan 13 to the possible frame body 11, 96 and to effectively utilize the space between the ribs 14 for reduced weight and improved reinforcement, such as in the aforementioned embodiments.

What is claimed is:

1. A disk drive comprising:

a case body;

a frame body accommodated within said case body;

a main-body portion disposed on said frame body, and provided with disk rotating driver for rotating a disk and reproducer for reproducing the information recorded in the disk;

a circuit board including a heat-generating member for controlling said main-body portion, said circuit board being disposed in a state such that said circuit board defines said case body into a machine room for accommodating said main-body portion and an airflow path room for allowing fresh air to flow therethrough such that said heat-generating member faces towards said airflow path room; and a cooling fan disposed within said case body and having a suction side communicated with said airflow path room.

2. A disk drive according to claim 1, wherein said frame body is formed in a tube-like shape opened at both end faces in the axial direction, respectively; and wherein said circuit board is mounted to one end face side of said frame body in a manner to tightly close the opening at the one end face side.

3. A disk drive according to claim 1, further comprising:

a heat radiating member having thermal conductivity, said heat radiating member including one face closely contacted with said heat-generating member of said circuit board and the other face closely contacted with an inner surface of said case body.

4. A disk drive according to claim 1, wherein said cooling fan is disposed on said frame body; and wherein said circuit board is opened with a through-hole for communicating said suction side of said cooling fan with said airflow path room, at the position closer to said suction side of said cooling fan than said heat-generating member.

5. A disk drive according to claim 4, wherein said frame body comprises: a supporting rib for supporting said main-body portion; and a duct part provided continuously to said supporting rib and having a tip end periphery closely contacted with said circuit board so as to surround said suction side of said cooling fan and said through-hole in a manner isolated from said main-body portion.

6. A disk drive according to claim 1, further comprising:

a flexible member having electrical insulation ability and interposed between said circuit board and an inner surface of said case body in a state for partitioning said airflow path room, to thereby surround a through-hole of said circuit board and said heat-generating member.

* * * * *